Figure 1:
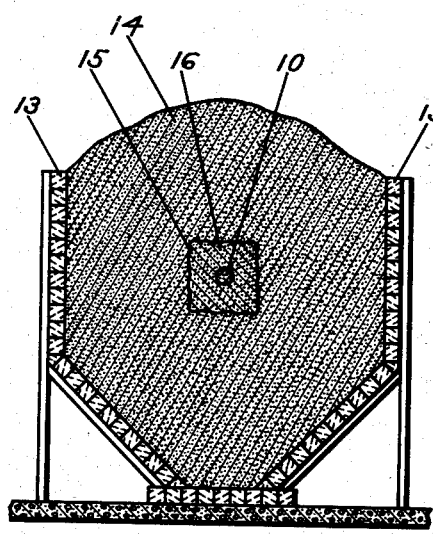

June 25, 1935.   R. R. RIDGWAY   2,005,956
METHOD OF MAKING ABRASIVE METAL CARBIDES AND AN APPARATUS THEREFOR Filed Dec. 2, 1931

WITNESSES
Franklin E. Johnson
Lois M. Reemie

Inventor
RAYMOND R. RIDGWAY
By Clayton R. Jenks
Attorney

Patented June 25, 1935

2,005,956

UNITED STATES PATENT OFFICE 2,005,956

METHOD OF MAKING ABRASIVE METAL CARBIDES AND AN APPARATUS THEREFOR

Raymond R. Ridgway, Niagara Falls, N. Y., assignor to Norton Company, Worcester, Mass., a corporation of Massachusetts Application December 2, 1931, Serial No. 578,547

13 Claims. (Cl. 204—62)

This invention relates to the manufacture of abrasive metal carbides of the group consisting of silicon and boron carbides and more particularly to a method of and an apparatus for making silicon and boron carbides by electrical reduction of the oxides of the corresponding metals.

Silicon carbide is made synthetically by heating a mixture of carbon and silica in an electric resistance furnace. It has been considered that silicon carbide is a non-conductor or a very poor conductor of electricity during its process of manufacture and that to obtain the necessary high temperature for the reaction, a core of granular carbon, such as metallurgical coke, is required for conducting the electric current and obtaining the heat of reaction. Hence, as explained in the U. S. patents to Acheson No. 560,291 and Hutchins No. 1,331,435, it has been customary to carry out the method along the following lines: The furnace is filled about half-full with a mixture of coke, sand and sawdust and a trench is dug in this furnace charge extending between the electrodes at opposite ends of the furnace. This trench is filled with granular graphite or metallurgical coke to form an electric conducting path or core. Thereafter, the remainder of the charge of sand, carbon and sawdust is placed on top of the trench. The electric current conducted through the carbon core serves to heat the interior of the charge to a temperature of from 1600° C. to 2600° C., between which temperatures the silicon carbide is formed. This temperature condition is maintained for a long period of time, such as 36 hours, during which the central core is consumed by the reaction or burns away and the remainder becomes graphitized. Adjacent to this core and within that temperature zone above 1600° C. the reactive ingredients combine to form silicon carbide. In the outer temperature zone below 1600° C. some silicon carbide is found intermingled with the unchanged material, this portion of the furnace charge being termed "fire sand". Outside of this layer of partially converted material is the unconverted material. When the furnace run has been completed, it is necessary to remove the outer layer of unconverted material and to separate the fire sand, the inner zone of silicon carbide, and the graphitized coke which remains in the core.

Boron carbide may be made similarly by electrical reduction of boron oxide, this being accomplished by mixing carbon and boron oxide in suitable proportions, charging the mixture into an electric resistance furnace around a resistor of carbon and passing an electric current through the resistor to develop a temperature of about 2400° C. The details of such a process may be found in my U. S. Patent No. 1,897,214 dated February 14, 1933. Since boron carbide has a high vapor pressure when heated to a high temperature and its crystals grow from the vapor phase, just the same as silicon carbide is formed, the general objects and features of this invention are applicable to boron carbide, and the claims are to be interpreted accordingly as covering either silicon carbide or the equivalent material boron carbide, which constitute a group herein designated as "abrasive metal carbides". The invention will be specifically described with reference to the manufacture of silicon carbide.

The prior practice has involved various disadvantages, due largely to the use of this core of granular carbon. For example, the electrical resistance of the core along its length is irregular because its cross section of path and its density of packing and the pressure of contact between the particles are not uniform. Hence, there are necessarily points of high and low resistance and consequent localized overheating. At these highly-heated spots, silicon carbide tends to form more rapidly, since the rate of reaction within the mixture takes place in proportion to the amount of power liberated in a given area. In this highly heated localized zone, the core will cut down in size and the material in its immediate neighborhood may shift in its position and so produce a pig of uneven shape and distribution. This affects the sharpness of separation of the zones of the completed silicon carbide and the partially completed material, hence the subsequent removal of the material of one zone from the other may be difficult. Moreover, the core of granular carbon becomes mixed with the high grade carbide adjacent thereto and extreme care must be taken to separate them.

The production of silicon carbide takes place only between the temperatures of approximately 1600° C. and 2600° C. The temperature gradient necessarily falls off sharply from the center of the furnace charge to the outer layer and consequently the material can be made only in a restricted zone adjacent to the heated center. It is, therefore, highly desirable not to waste this central portion of the furnace by filling it with the carbon core.

It is accordingly one object of this invention to overcome such disadvantages and to provide an efficient and economical method of making an abrasive metal carbide which will give a large yield of the carbide of the desired purity for a given power consumption, and otherwise to improve the procedure in the manufacture of this synthetic material.

Silicon carbide manufactured by the above outlined procedure shows a marked gradation in the type of product and a lowering in the quality of the material found in successive concentric zones going outwardly from the core. The growth of large interlocking crystals in this process is a time-temperature function and since the material surrounding the central core has the greatest temperature for the longest time, this material is necessarily of the better quality. The outer zones of the ingot are inferior in crystallization and purity. It has been found by repeated analysis that the impurities which exist in the raw materials are decomposed by the high temperatures existing in the central portion of the charge and that these condense in the outer zones. Consequently, the inner zone of silicon carbide is pure and the outer portion is of lower grade. Because of this, it has been customary to classify the ingot formed by the reaction into many concentric zones of various degrees of usefulness.

It has been considered advisable, in practice, to return to succeeding furnace mixtures the incompletely reacted and crystallized material occurring in the outer zones, in order that the silicon carbide may be reclaimed from the raw materials. The return to a subsequent furnace charge of any or all of the material found in these zones is conditional upon the state of purity of the returned material and the purity of the product which it is desired to make in the new run. I have found in the course of my experimentation that the reintroduction of this partially converted material to the new charge improves the yield of satisfactory product in the succeeding furnace run. However, this improved yield is not proportional to the amount returned to the furnace, since only that part of this semiconverted material which is returned to the proper temperature zone becomes available for forming pure silicon carbide, while the balance of it is distributed throughout the mixture in the outer zone where reaction does not take place to the desired extent. This material interspersed throughout the mixture in the outer zone has, moreover, been found to be detrimental since it tends to increase the thermal and the electrical losses from the central ingot.

It is, therefore, a further object of my invention to so carry on the process of manufacturing an abrasive metal carbide that the partially converted material, or the material having a high content of impurities, derived from a preceding furnace run, may be satisfactorily and economically reclaimed and developed into a product of desired characteristics.

In accordance with my experimentation, I have discovered that within the abrasive metal carbide furnace, the ingot of carbide generated by the reaction carries a large proportion of the current after it has been developed to an appreciable size, and I therefore propose to utilize the carbide as the central heat-conducting core of the resistance furnace in which it is made. I also propose to utilize for this purpose that outer zone of partially converted material obtained from a previous furnace run, which, in the case of silicon carbide, is known as fire sand and which is made up of lumps or granules of silicon carbide intermingled with various other substances including impurities and the raw materials originally utilized for the furnace charge. In this way, I return this recoverable material to a second furnacing operation and place it within the zone of reaction surrounded by the charge of unconverted materials. It is desirable that the silicon carbide form the major portion of the core, hence care is taken in separating the unconverted material from the fire sand to insure that only the richer portion of this fire sand is used, so that the silicon carbide core, which is located in the center of the unconverted and poorly conducting mixture of sand and carbon, may serve readily as a starting resistor for the synthesis of further silicon carbide.

Boron and silicon carbides have high negative temperature coefficients of resistance, hence each has a poor conductivity in the cold state, although it is an excellent conductor when heated. It is, therefore, feasible to employ the abrasive metal carbide alone as the electrically conducting core, and its conductivity is increased by compressing the loose particles under high pressure or by tamping it in place into a more dense body. If desired, sufficient carbon may be incorporated therewith to improve its conductivity. By using a variable voltage transformer of a wide voltage range, it is feasible to impress sufficient voltage on the metal carbide core to cause current to flow through the cold material. As the material becomes heated and as the ingot of metal carbide builds up, the furnace resistance decreases. The transformer is accordingly regulated to maintain the desired power input.

It is, however, desirable to keep the voltage range of the furnace operation within practical limits; hence, in accordance with a further feature of my invention, it is my preferred practice to utilize with the metal carbide core a high conductivity resistor, and preferably one of small cross section which is continuous about the longitudinal axis of the furnace, and thereby to start the flow of current readily and heat the carbide core to a temperature at which it will readily carry the current under a low voltage. For this purpose, I may utilize a resistor of suitable conducting material, such as carbon, extending between the two opposed terminal electrodes of the resistance furnace. This core may be made of granular material laid in a trench within the center of the abrasive metal carbide or the fire sand core, but it is preferably made up of a solid rod or of separate rod or plate sections joined or touching one another, which has sufficient conductivity and the correct resistance to develop a temperature satisfactory for starting the reaction. Various other standard materials may be employed for this conducting core, such as a rod made of a mixture of granules of silicon carbide with carbon or silicon or other conducting materials which are proportioned to give the desired conductivity. One type of resistor of this class is marketed under the trade name of "Globar". In such a case, the silicon carbide and silicon resistor rod may take the place of either or both the inner carbon rod, above specified, and the core of silicon carbide granules packed around the carbon rod. The size of this resistor and of the metal abrasive core, as well as the exact nature of the material employed will, of course, depend upon the requirements of the particular furnace run to be made.

I have found that a carbon rod 2 inches in diameter and 20 feet long will have a total cold resistance of 0.08 ohms, and that a resistor of this type when supported by the charge will carry a current of from 1000 to 3000 amperes per square inch of cross section of the rod and with sufficient length of life to cause the silicon carbide reaction to start within the furnace charge and to permit the inner core of silicon carbide to become sufficiently heated so that it will itself take up the duty of carrying the required amperage. In order that one may control the temperature conditions and the amount of power conveyed to the furnace, a suitable transformer with a desired voltage range will be provided. An ordinary furnace transformer with a voltage range no greater than four to one from highest to lowest voltage will serve to regulate the current flow through the resistor rod and the furnace charge. If the transformer has sufficient range of voltage for the purpose, the inner conducting rod or core of carbon may be omitted and a high enough voltage impressed upon the silicon carbide core to start the current flow directly therethrough. The voltage will be reduced gradually, in such a case, as the temperature rises, so that the desired power input will be maintained.

The limiting range of current is largely determined by the rate at which the resistor is reacted upon by the surrounding charge, but since the resistor rod is surrounded only by silicon carbide and is not in contact with silica or other oxidizing agents, its life is materially increased over that which would be had if it contacted directly with the charge of unconverted material. The silicon carbide also acts as a protector against localized high power liberation, since it is in contact with and parallel to the rod throughout its entire length. Hence, it shares the current by forming a multiple circuit, and any localized high resistance which develops in the rod due to defects of assembly or manufacture or to disturbance of the charge is automatically compensated for. The localized over-heating increases the conductivity of the surrounding silicon carbide and causes it to take more of the current.

In the preferred practice of my invention, as applied to the manufacture of silicon carbide, I have combined these various features as illustrated diagrammatically in the drawing, in which:

Fig. 1 is a cross sectional view and

Figure 3:
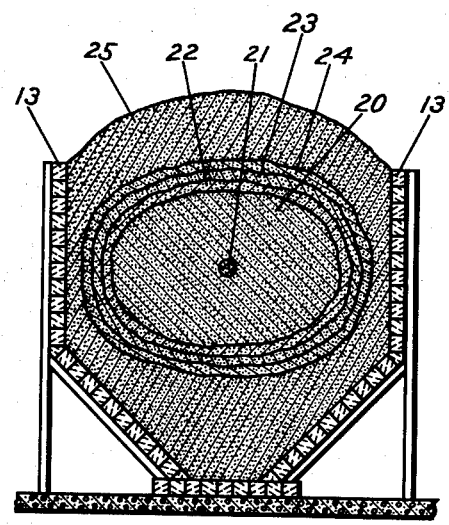
Figure 2:
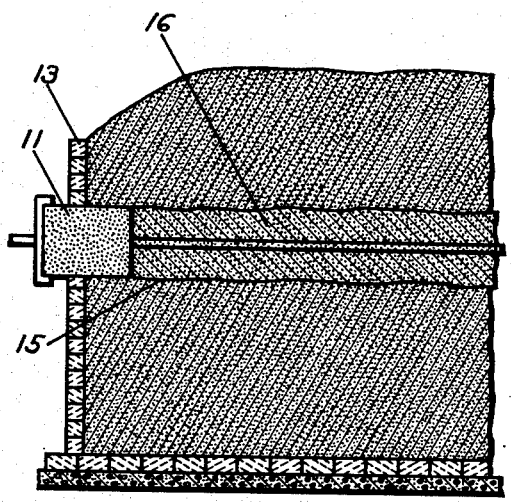
Figure 2:
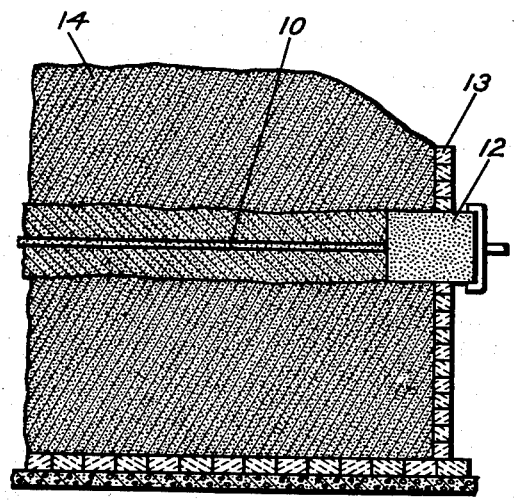

Fig. 2 a longitudinal section through a furnace and its charge before the run; and Fig. 3 is a cross sectional view of the furnace and its charge after the run.

As shown in the drawing, a 2 inch carbon rod 10 about 18 feet long is inserted in the center of the furnace between the two terminal electrodes 11 and 12. It may be made of short sections threaded together or lying in contact with one another, but any suitable form of resistor may be employed for the purpose of initially carrying the current and providing sufficient heat to start the reaction. Such a rod has a high ratio of length to cross sectional area which is preferably in excess of 100 to 1, but the dimensions will necessarily be calculated in accordance with the electro-chemical requirements of the furnace. Beneath this rod 10, and within the walls 13 of the furnace, I place a mixture 14 of sand, coke, sodium chloride and sawdust, in accordance with prior practice, or any desired mixture of material suitable for the purpose and proportioned for the synthesis of silicon carbide. Surrounding the rod in a channel 15 made for the purpose in the furnace charge, is the resistor core 16 made from 1000 to 3000 pounds of silicon carbide, such as fire sand which has been reclaimed from a previous run. This core of silicon carbide or fire sand is distributed symmetrically and packed together to give a high density so that it will conduct the current readily. The carbon resistor rod may be omitted if the silicon carbide or fire sand is combined with a suitable conductor, such as silicon, or compacted tightly to form a resistor of sufficient conductivity. If desired, a small amount of other materials such as sand, carbon, silicon or sodium chloride may be added to this core in order to adjust its composition and change its resistance and thus control the electrical conductivity of the charge or to assist in the volatilization of the impurities which may be present and otherwise aid in the operation of reclaiming the silicon carbide from the core and forming a satisfactory product. The core will, of course, be covered with a further amount of the unconverted charge the same as that below the rod. Since the carbon rod is small in cross section, it is greatly overpowered by the furnace load, but the silicon carbide core serves as a second path for the current. Hence, even if the small, fragile rod breaks or is consumed early during the furnace run, the current will shift from the rod and flow through the silicon carbide core and the furnace operation will go on successfully.

At the end of the furnace run, the charge has the general appearance shown in cross section in Fig. 3, in which there is a large central portion 20 consisting of first class silicon carbide made up of the resistor 16 shown in Figs. 1 and 2 and a portion of the charge 14 which has been converted to the crystalline silicon carbide. If any of the carbon rod 10 remains, it will be found as pieces 21 at the center of this mass. Surrounding this pig of silicon carbide are successive zones 22, 23 and 24 having decreasing amounts of silicon carbide therein and the outer unconverted charge 25. It is the material of zones 22, 23 and 24 which is taken from a preceding furnace run and used for forming the silicon carbide resistor of a succeeding run.

As a further feature of this invention, we may include some sand or silica with the fire sand or silicon carbide which makes up the inner resistance core. This sand is believed to react with the silicon carbide to form silicon and this reaction is considered to take place at a lower temperature than that at which the silicon carbide forms. This silicon metal is thought to impregnate the silicon carbide core and serve as a cement to hold these granules together and thus give the SiC core greater conductivity. This excess of silicon reacts with the excess of carbon, which is always present in fire sand, to form additional silicon carbide. In accordance with my preferred practice, we may use from 50 to 100 pounds of silica to 2500 pounds of the reclaimed silicon carbide or fire sand which has been taken from a previous pig and is used as the central resistor core for the new furnace charge.

It will now be apparent that this method is applicable for the purification of fire sand or other partially converted charge containing abrasive metal carbide. In such a case, the impure carbide may be placed in the furnace as above described and surrounded with suitable granular material, such as a charge of carbon and the oxide of the metal of the carbide, and the current flow will be regulated for the purpose intended. The material to be purified may be mixed with carbon or silica or silicon or other suitable material in order that the reaction may proceed as desired.

The resistor rod may be employed or omitted, depending upon the facilities in the plant for applying sufficient voltage to the mass to heat it, as well as various other practical considerations.

This silicon carbide placed in the center of the furnace charge accomplishes various purposes. It serves as a conductor during the major portion of the run and thus makes it unnecessary for one to employ the granular core of metallurgical coke or other carbon heretofore provided which had to be carefully separated from the silicon carbide after the furnace run. If reclaimed material is used, it has its impurities driven into the outer zones of the furnace and is thus thoroughy purified. All of the valuable silicon carbide present in the core is reclaimed and none is lost. This core of silicon carbide, whether or not contaminated with impurities, is located in the hottest zone and it may be recrystallized or even distilled into the surrounding reactive zone as the power input is regulated. This distillation results in an ingot of large crystals and of great density and uniformity. The new silicon carbide created by the reaction serves to cement together and build up a very dense, desirable structure which is a highly satisfactory abrasive material. The greater density of charge lying in the high temperature zone of the furnace gives a greater product density and consequently a greater yield with the same power expenditure. Thus, this reintroduction of a partially converted material into the central portion of the furnace improves the yield of satisfactory silicon carbide.

By thus using what we may term a self forming resistor, namely, the silicon carbide present in the central zone around a carbon rod, various other advantages will be derived. As above stated, this silicon carbide keeps the unreduced silica in the outer charge from contacting with the carbon electrode and so prevents reaction therebetween. It furthermore serves to support the carbon rod and minimize the danger of its breakage until the temperature has come to a sufficiently high degree for the process. If the carbon rod were placed simply within the mixture of sand and coke as has heretofore been attempted, then as the material settles away from the rod in the initial stages of the reaction, the rod will not be supported and may break and so impede the current flow. Furthermore, this innermost core of silicon carbide serves to distribute electric current to a large area within the furnace and so absorbs the load thermally and electrically. There is no large cavity developed within the ingot, as has been the case in the prior practice, since the silicon carbide in the core has been previously shrunk to substantially its maximum density and this inner core material therefore remains practically solid. The same general advantages will be found in the application of this invention to the manufacture of boron carbide.

Having thus described my invention, what I claim as new and desire to secure by Letters Patent is:

1. The method of making abrasive metal carbide comprising the steps of providing partially converted material containing said carbide derived from a preceding furnace run and forming therefrom a resistance core located in the central high temperature zone of a resistance furnace, surrounding said core material with a charge containing uncombined oxide of the metal and carbon in suitable proportions for the reaction and passing an electric current through the core and thereby developing a temperature capable of forming said carbide from the charge.

2. The method of making silicon carbide comprising the steps of producing silicon carbide synthetically in an electric resistance furnace from a charge containing silica and carbon, separating the inner zone of silicon carbide from the outer zone of partially converted material containing silicon carbide and impurities and returning a portion of this outer zone material to the inner zone of a furnace for a succeeding run and there subjecting the partially converted material to the high temperature of the inner zone, purifying the same and developing silicon carbide of high quality.

3. The method of making silicon carbide comprising the steps of mixing fire sand with silica in the proportions of 2500 pounds of fire sand and 50 to 100 pounds of silica, placing the same in the central zone of a resistance furnace surrounded by a charge containing silica and carbon and passing an electric current through the mixture to synthesize silicon carbide from the charge.

4. The method of making abrasive metal carbide comprising the reduction in an electric resistance furnace of an oxide of the metal by means of carbon intermixed therewith in a charge of proper composition for electrical synthesis of the carbide and characterized by the steps of gradually heating the charge to the synthesizing temperature by passing an electric current through a resistance core, the major portion of which is the abrasive metal carbide derived from a previous furnace run and which is located within the charge in the central high temperature zone of the furnace, forming the abrasive metal carbide by synthesis of the charge and producing a progressively enlarging ingot of the synthesized material and the abrasive metal carbide of the central core.

5. The method of making silicon carbide according to claim 4 in which the central resistance core is largely silicon carbide and the charge is converted to an ingot having a dense core of silicon carbide of high purity.

6. The method of claim 4 in which the core initially contains abrasive metal carbide intermixed with a material which is electrically conductive in the cold condition but will not detrimentally affect the final ingot, and the voltage is regulated to cause the core to carry such a current load as to heat the core and initiate the synthesis of said carbide.

7. The method of claim 4 in which the core of abrasive metal carbide is initially heated by a resistor embedded therein which has such a conductivity that it will raise the temperature of the core to a point at which the core will carry the major portion of the load and heat the charge to a synthesizing temperature and in which the composition of the resistor will not detrimentally affect the final ingot.

8. The method of making silicon carbide according to claim 4 in which the core of silicon carbide is initially heated by a resistor rod embedded in the core and comprising silicon carbide whereby the final ingot is substantially free from contamination by resistor material of a different composition.

9. The method of claim 4 in which the core is heated initially by a resistor of graphite embedded within the core which has a high ratio of length to its cross sectional area and such a conductivity that it will serve to heat the carbide core to that temperature at which it will carry the load and cause the synthesis of the desired product.

10. The method of claim 4 in which the core is made chiefly of fire sand and is provided with a silica content sufficient to form silicon carbide by reaction with the excess of carbon therein.

11. The method of purifying abrasive metal carbide comprising the steps of forming it as a central core within a charge containing the unconverted oxide of the abrasive metal and carbon proportioned for electrical synthesis of the carbide, heating the central portion of the mass in an electric resistance furnace to a temperature at which said charge is converted to the abrasive metal carbide in a progressively enlarging ingot, and causing the impurities in the core to be volatilized and driven into an outer zone of the charge while the purified material remains as the center of the ingot.

12. The method of making silicon carbide comprising the steps of providing a furnace charge containing silica and carbon proportioned for the formation of silicon carbide, placing within the central portion of said charge a core, the major portion of which is loose granular silicon carbide and which is so constituted that it will carry the furnace load within the voltage range of the furnace and develop a temperature in excess of 1600° C. sufficient to form said carbide, connecting the furnace terminals by a graphite resistor rod located within said core which is of small cross section and will be largely consumed during the furnace operation but is capable of carrying sufficient current to heat the core initially to a temperature at which it will carry the load, and thereafter passing an electric current of regulated voltage through the rod to heat the core to a highly conductive condition so that it will carry the load and thereby develop said temperature, and producing a progressively enlarging ingot of silicon carbide from the synthesized charge and core.

13. The method of making silicon carbide according to claim 4 in which the core comprises incompletely converted, impure silicon carbide and contains a resistor capable of conducting the current initially and heating the core to a temperature at which it will act as an auxiliary resistor, and in which an electric current is passed through the resistor with a power input sufficient to produce a synthesizing temperature within the charge, and the impurities in the core are driven into an outer zone of the charge, while a progressively enlarging ingot of silicon carbide is formed.

RAYMOND R. RIDGWAY.